United States Patent
Allen et al.

(10) Patent No.: US 7,889,848 B2
(45) Date of Patent: Feb. 15, 2011

(54) TELECOMMUNICATION SERVICE WITH PRE-PAID ACCESS

(75) Inventors: William Henry Allen, Pleasanton, CA (US); Gail Ann Churillo, Fremont, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1207 days.

(21) Appl. No.: 11/197,012

(22) Filed: Aug. 3, 2005

(65) Prior Publication Data

US 2007/0036307 A1 Feb. 15, 2007

(51) Int. Cl.
*H04M 15/00* (2006.01)

(52) U.S. Cl. .................. 379/114.2; 379/127.03

(58) Field of Classification Search ............ 379/114.03, 379/114.15, 114.17, 114.19, 114.2–114.25, 379/127.02–127.05, 201.02, 220.01, 221.01, 379/221.02, 221.14, 222, 223
See application file for complete search history.

(56) References Cited

U.S. PATENT DOCUMENTS

| | | | |
|---|---|---|---|
| 5,633,919 A | 5/1997 | Hogan et al. | |
| 5,946,380 A | 8/1999 | Cohen et al. | |
| 6,137,877 A * | 10/2000 | Robin et al. | 379/352 |
| 6,157,823 A | 12/2000 | Fougnies et al. | |
| 6,195,422 B1 * | 2/2001 | Jones et al. | 379/127.05 |
| 6,434,378 B1 | 8/2002 | Fougnies | |
| 6,597,776 B1 | 7/2003 | Walker et al. | |
| 6,614,781 B1 | 9/2003 | Elliott et al. | |
| 6,788,771 B2 | 9/2004 | Manto | |
| 6,952,575 B1 * | 10/2005 | Countryman et al. | 455/408 |
| 7,333,596 B1 * | 2/2008 | Dowens | 379/114.2 |
| 7,394,895 B2 * | 7/2008 | Bedingfield et al. | 379/201.02 |
| 2001/0028705 A1 | 10/2001 | Adams et al. | |
| 2002/0076018 A1 | 6/2002 | Banks et al. | |
| 2004/0083290 A1 | 4/2004 | Chen et al. | |
| 2004/0151292 A1 | 8/2004 | Larsen | |

OTHER PUBLICATIONS

PCT International Search Report and Written Opinion dated Sep. 17, 2007 for Application No. PCT/US06/29961.

* cited by examiner

*Primary Examiner*—Quoc D Tran
(74) *Attorney, Agent, or Firm*—Parks IP Law LLC; Jonathan A. Paulis

(57) ABSTRACT

A method and system for implementing pre-paid telephone service with direct dial pre-paid access and direct dial or indirect dial post paid access. The method includes receiving a telephone call and routing the telephone call to a pre-paid platform if the access designation is a direct dial access designation other than 1 or 011. The system includes a local exchange carrier configured to receive a telephone call and route the call to a long distance carrier, where the long distance carrier is configured to route the call to a pre-paid platform if the access designation is a direct dial access designation other than 1 or 011.

22 Claims, 5 Drawing Sheets

TELECOMMUNICATION SERVICE WITH PRE-PAID ACCESS

FIELD OF THE INVENTION

The present invention relates to a system and method for allowing a subscriber access to pre-paid telecommunication service by dialing a telephone number with a direct dial access designation.

BACKGROUND

A pre-paid telephone service is where a subscriber pays for an account with a pre-determined monetary value. Through a network platform, the duration of a call is monitored and the account is debited according to a specified rate.

Traditionally, a pre-paid account may be purchased by a customer at a retail store in the form of a long distance calling card. The customer uses special toll free numbers associated with the calling card to access the pre-paid account. Alternatively, a pre-paid account may be purchased through a customer service representative and associated with a subscriber's telephone. The pre-paid account is triggered by the subscriber making a regular 1+ toll call. Instead of the call being billed to the customer's regular telephone account, the call is debited from the subscriber's pre-paid account.

Using a long distance calling card requires dialing extra digits in order to use the pre-paid service. This is inefficient. While a pre-paid account associated with a subscriber's telephone eliminates the need to dial extra digits, other problems arise. Specifically, because the subscriber's pre-paid account only triggers when dialing a regular 1+ toll call the subscriber is forced to choose between pre-paid or post-paid service and cannot have both concurrently.

Although the 1+ pre-paid service is functional, there is a need for more flexible access to pre-paid service.

BRIEF SUMMARY

In order to address the deficiencies in the prior art and provide improved performance, an improved system and method are provided for allowing direct dial pre-paid telecommunication access. According to a first aspect of the invention, a method is provided for providing pre-paid long distance telecommunication services to a subscriber having a telecommunication device configured to communicate with a telecommunication network. A telephone call made from the telecommunication device to a destination telephone number is received. If the destination telephone number has a direct dial access designation other than 1 or 011 the call is routed to a pre-paid platform.

According to another aspect of the invention, a system for providing direct dial pre-paid telecommunication services is disclosed. The system includes a local exchange carrier in communication with a telecommunication network configured to receive a telephone call from a telecommunication device to a destination number and route the call over the network to a long distance carrier. The long distance carrier is configured to route the call to a pre-paid platform if the telephone call has a direct dial access designation other than 1 or 011.

DETAILED DESCRIPTION OF THE PRESENTLY PREFERRED EMBODIMENTS

In order to use a direct dial post paid access method a subscriber may dial "one" plus a domestic telephone number ("1+") or "zero one one" plus an international telephone number ("011+"). In order to use a direct dial pre-paid access method a subscriber may dial "zero" plus a domestic telephone number ("0+") or "zero one" plus an international telephone number ("01+"). Indirect dial post-paid access may be provided by just dialing "zero zero" ("00–").

The following embodiments are described with reference to domestic calls, i.e. calls to 1+, 0+, or 00– numbers. However, any of these embodiments may be implemented to handle international calls, i.e. calls to 011+ or 01+ numbers, in addition to, or instead of, domestic calls.

Figure 1:
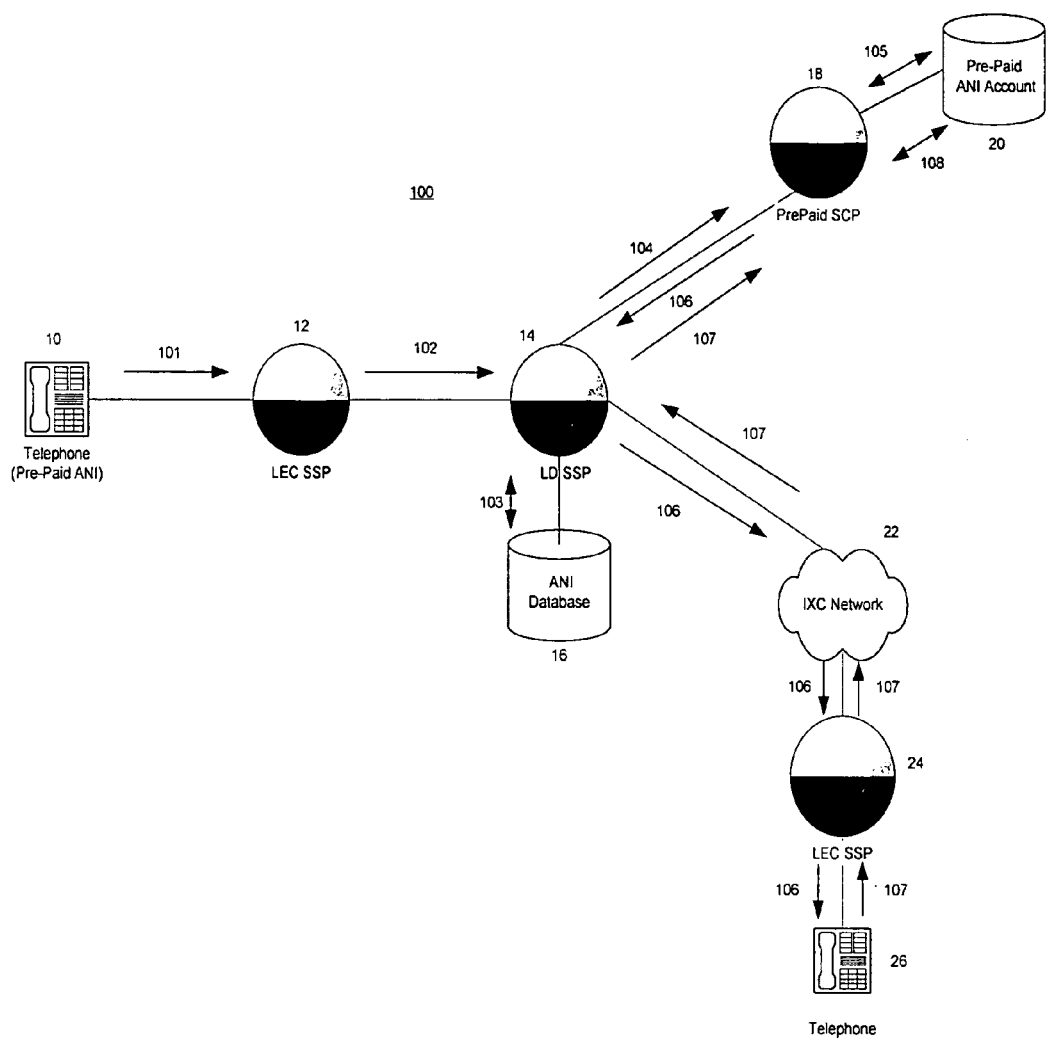
FIG. 1 is a block diagram of a direct dial pre-paid call flow within a pre-paid call system.

Referring to FIG. 1, a 0+ pre-paid call system is depicted. The system includes two or more telecommunication devices (10, 26) configured to communicate with a telecommunication network (100) which may include the depicted network elements (10, 12, 14, 16, 18, 20, 22, 24, 26) as well as other network elements that are not shown. In one embodiment the telecommunication device (10) is configured to communicate with a local exchange carrier ("LEC") (12). The LEC (12) is configured to communicate with a long distance carrier (14). The long distance carrier (14) is configured to communicate with a pre-paid platform (18), an inter-exchange carrier ("IXC") network (22), and a pre-paid automatic number identification ("ANI") lookup database. The pre-paid platform (18) is configured to communicate with a pre-paid ANI account database (20). The LEC (24) is configured to communicate with the IXC Network (22). The LEC (24) is also configured to communicate with the telecommunication device (26).

The local exchange carriers (12, 24) and the long distance carrier (14) may be implemented as service switching points ("SSP"). The pre-paid platform (18) may be implemented as a service control point ("SCP") capable of Signaling System Seven ("SS7") query processing. The telecommunication devices (10, 26) may be wireless or land-line devices. The telecommunication lines of the telecommunication network (100) may be land-lines, wireless communication networks, or any combination of the two. In one embodiment, the pre-paid ANI account database (20) and the pre-paid ANI lookup database (16) are the same database.

FIG. 1 also depicts a 0+ pre-paid call flow illustrating how 0+ pre-paid access may be accomplished. First, a subscriber dials a 0+ telephone number using an input, such as the touch tone keypad of the telecommunication device (10). As described above, a 0+ telephone number is a domestic telephone number preceded by a lone zero. The lone zero is an example of a direct dial pre-paid access designation. One example of a 0+ telephone number is an eleven digit number where the first digit is a 0 and the remaining ten digits conform to a 3-3-4 scheme for ten digit domestic telephone numbers. Typically, the first three digits of the 3-3-4 scheme represent the area code ("NPA"), the second three digits represent the prefix ("NXX"), and the last four digits represent the line number.

In response to the subscriber dialing the 0+ telephone number the telecommunication device routes the call and call context to the LEC (12) (Step 101). Call context may be any information associated with the call and usually includes at least the ANI value associated with the telecommunication device (10) making the call. The LEC (12) receives the call and call context from the telecommunication device (10) (Step 101). The LEC identifies the destination telephone number as a 0+ telephone number and routes the call and call context to the subscriber's long distance carrier (14) (Step 102). The long distance carrier (14) determines where to route the call by querying the ANI Database (16) using the telecommunication device's ANI value (Step 103). If the query verifies the telecommunication device (10) is associated with a valid pre-paid account then the call and the call context is routed to the pre-paid platform (18) associated with that pre-paid account (Step 104). Otherwise the subscriber's call would be routed to an alternate billing platform (not shown).

The pre-paid platform (18) queries the pre-paid ANI account database (20) to verify the pre-paid account has a desired minimum balance (Step 105). If the pre-paid account does not have the desired minimum balance the subscriber is notified and the call is terminated or transferred to an interactive voice response ("IVR") system. In one embodiment the IVR system allows the subscriber to deposit money into their account. In another embodiment the IVR system allows the subscriber access to an alternate billing method. Access may be provided through the telecommunication network (100) to an alternate billing platform (not shown) or in the alternative the pre-paid platform may contain the necessary logic to handle the alternate billing method desired by the subscriber.

Upon verification, the call and call context are routed through the telecommunication network (100, 14, 22) to the destination telecommunication device (24) (Step 106). When the call is answered the telecommunication device (26) routes an answer message ("ANM") signal back to the pre-paid platform (18) through the telecommunication network (100, 24, 22, 14) (Step 107). The pre-paid platform (18) monitors the call and communicates with the pre-paid ANI account database to debit the pre-paid account based on the duration of the call (Step 108). The monitoring and debiting may be done after the call is terminated, in real time, in a fixed increment, or any combination thereof.

Figure 2:
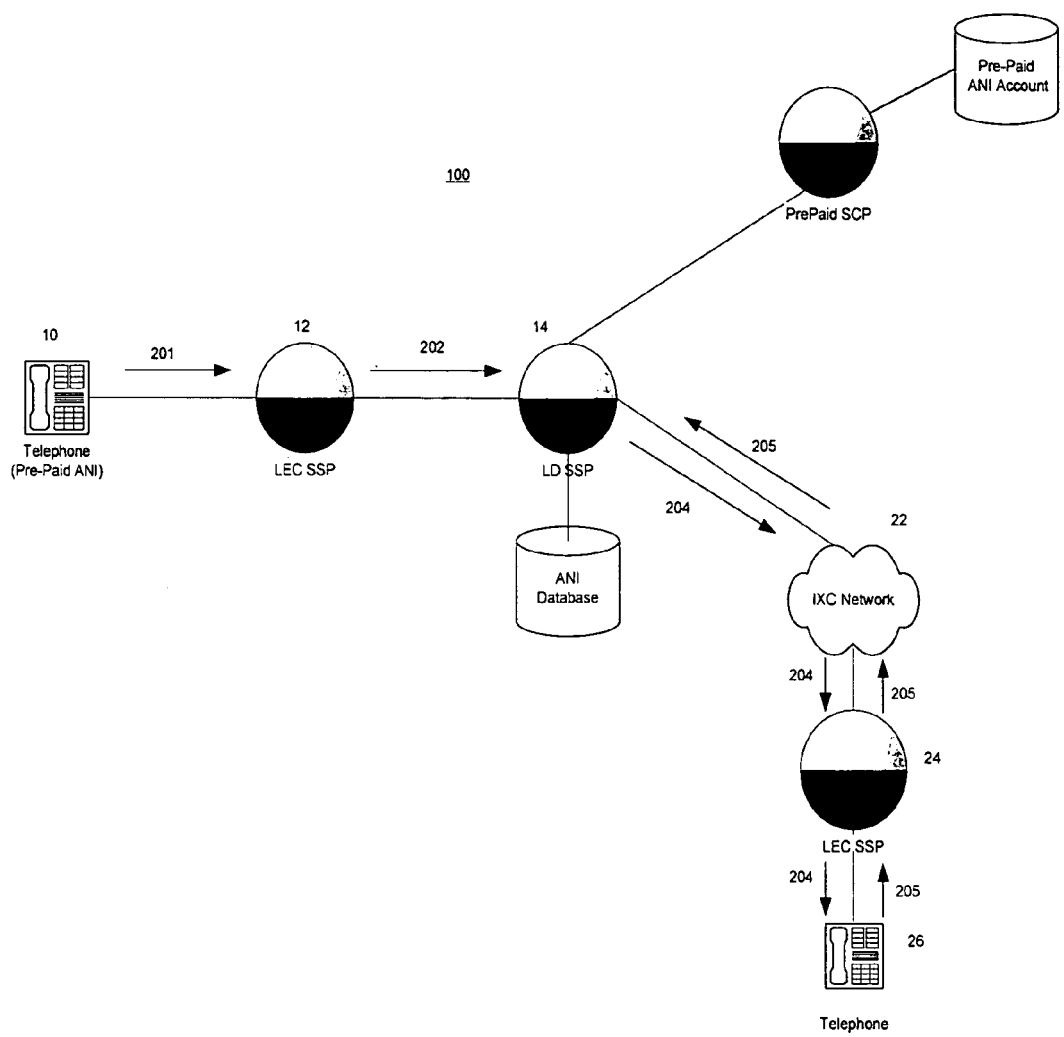
FIG. 2 is a block diagram of a direct dial post paid call flow with toll free access within a pre-paid call system.

Referring to FIG. 2, a 1+ post paid call flow with 1+ toll free call access is depicted. This embodiment may be implemented using the 0+ pre-paid call system described above. The subscriber uses the telecommunication device (10) to dial 1+ the destination telecommunication device's (26) toll free number (Step 201). The 1 preceding the toll free number is an example of a direct dial post paid access designation. One example of a 1+ toll free number is 1-800-XXX-XXXX. In response to the subscriber dialing a 1+ toll free number the telecommunication device routes the call and call context to the LEC (12) (Step 201). The LEC identifies the destination telephone number as a 1+ toll free number, queries the National Service Management System ("SMS") Database (not shown), and routes the call and call context to the long distance carrier (14) associated with the dialed toll free number (Step 202). The long distance carrier (14) determines where to route the call by querying a long distance toll free service platform (not shown). The call is routed through the telecommunication network (22, 24) to the destination based on the query (Step 204). When the call is answered the telecommunication device (26) routes an ANM signal to the long distance carrier (14) which triggers minutes of use ("MOU") monitoring for billing (Step 205).

Figure 3:
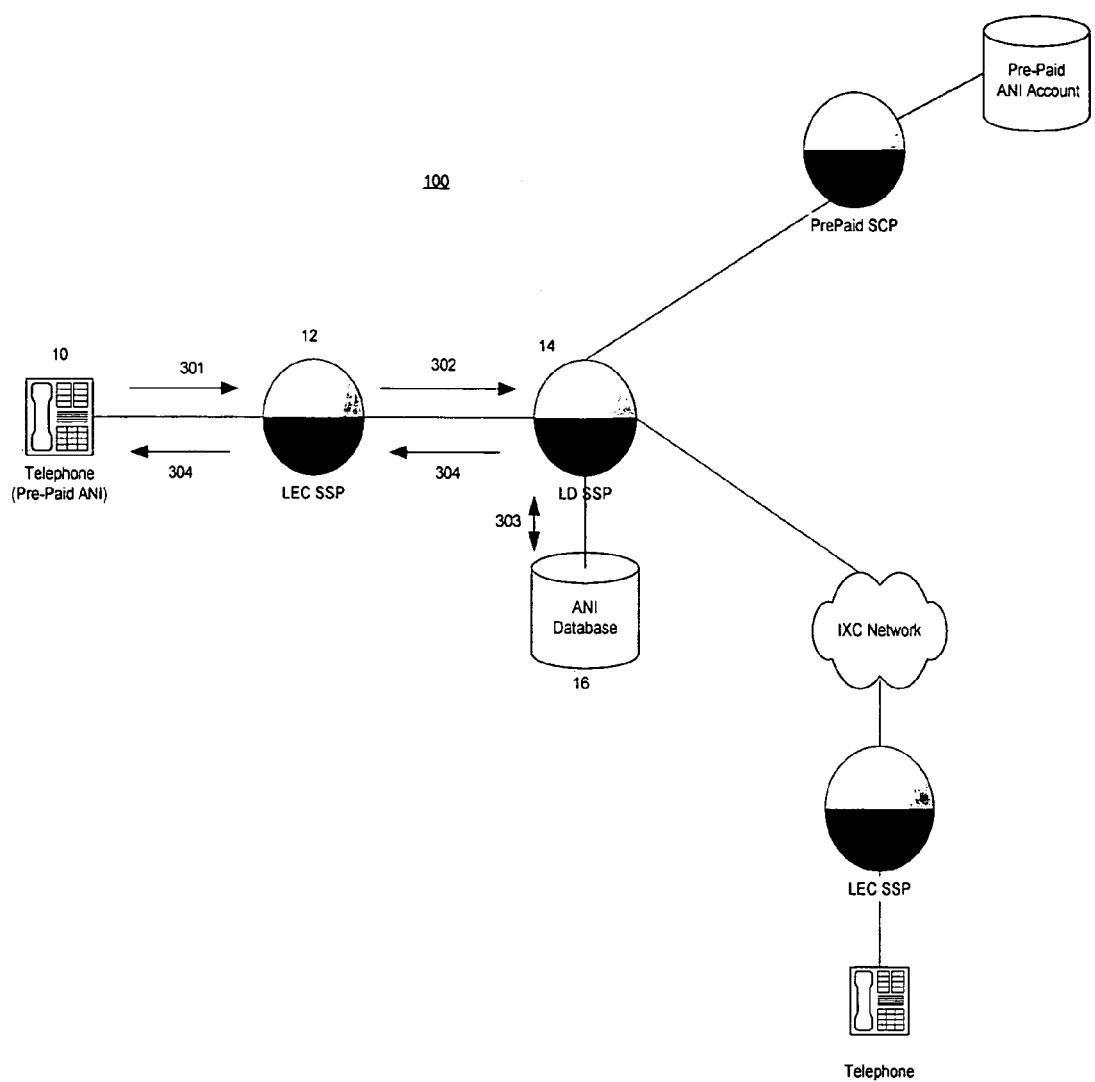
FIG. 3 is a block diagram of a direct dial post-paid toll call flow with a post paid restriction within a pre-paid call system.

Referring to FIG. 3, a 1+ post paid call flow with a 1+ post paid restriction is depicted. This embodiment may be implemented using the 0+ pre-paid call system described above. The subscriber uses the telecommunication device (10) to dial 1+ the destination telecommunication device's (26) toll number (Step 301). In response to the subscriber dialing the 1+ toll number the telecommunication device routes the call and call context to the LEC (12) (Step 301). The LEC identifies the destination telephone number as a 1+ toll call and routes the call and call context to the subscriber's long distance carrier (14) (Step 302). The long distance carrier (14) queries the ANI database (16) using the telecommunication device's ANI value and determines the pre-paid account has a 1+ post paid restriction (Step 303). The long distance carrier (14) notifies the subscriber and terminates the call (Step 304).

A post paid restriction on a pre-paid account blocks all post paid toll calls, domestic or international, allowing the subscriber to only make toll free calls or pre-paid calls. This restriction may be due to non-payment or requested by the subscriber. The 0+ pre-paid call system is also compatible with post paid restrictions associated with an ANI. For example, it is possible to prevent all toll calls or limit toll calls by destination, MOU, or credit rating associated with a particular ANI.

Figure 4:
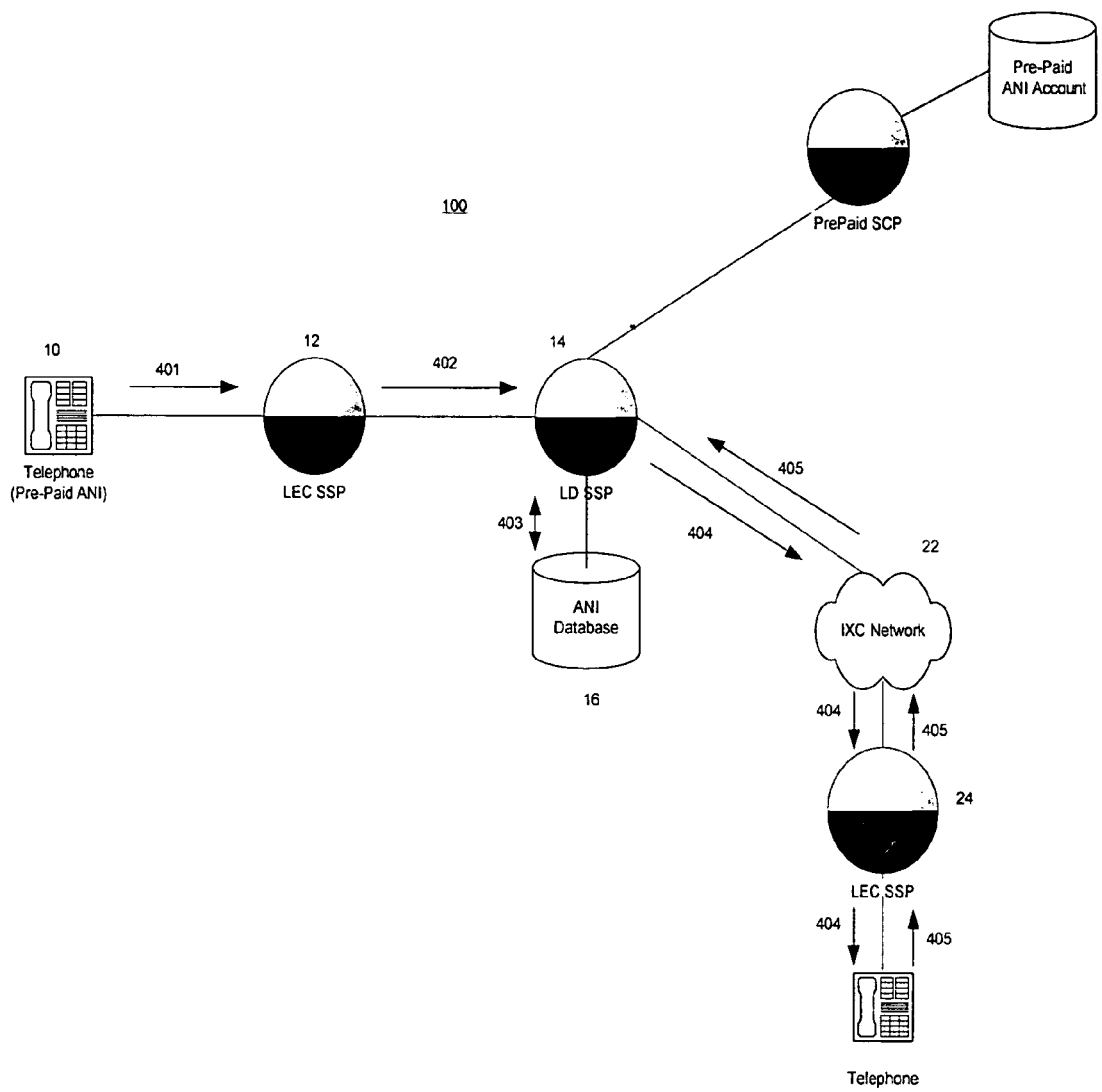
FIG. 4 is a block diagram of a direct dial post paid toll call flow with a post paid option within a pre-paid call system.

Referring to FIG. 4, a 1+ post paid call flow with a 1+ post paid option is depicted. This embodiment may be implemented using the 0+ pre-paid call system described above. The subscriber uses the telecommunication device (10) to dial 1+ the destination telecommunication device's (26) number (Step 401). In response to the subscriber dialing the 1+ number the telecommunication device (10) routes the call and call context to the LEC (12) (Step 401). The LEC identifies the destination telephone number as a 1+ toll number and routes the call and call context to the subscriber's long distance carrier (14) (Step 402). The long distance carrier (14) queries the Pre-Paid ANI Lookup Database (16) using the telecommunication device's ANI value to determine if the pre-paid account has a 1+ post paid option (Step 403). If the query verifies the telecommunication device (10) is associated with an account with access to 1+ post paid calls then the call is routed through the telecommunication network (22, 24) to the destination telecommunication device (26) (Step 404). Otherwise the subscriber is notified and the call is terminated. When the call is answered, the telecommunication device (26) uses an ANM signal to trigger MOU monitoring for post-paid billing (Step 405).

A post paid option on a pre-paid account allows post paid toll calls, domestic or international, in addition to the toll free and pre-paid calls allowed with 0+ pre-paid access. This option may be provided by request, as an incentive, or as a backup. For example, a subscriber may be offered pre-paid access at a reduced rate relative to the subscriber's post paid rate. In another example, a subscriber with a post paid restriction may be offered a post paid option which allows a certain number of post paid MOU.

Figure 5:
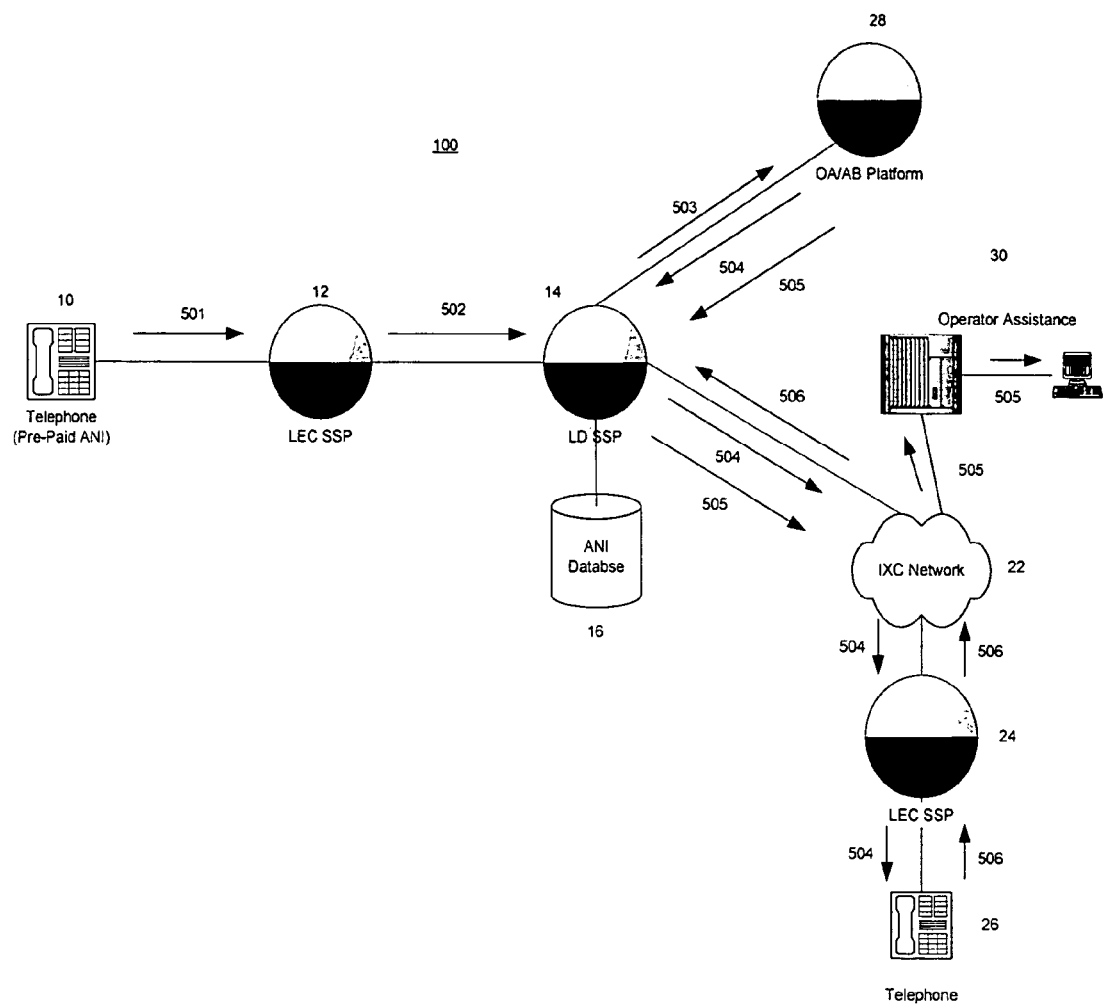
FIG. 5 is a block diagram of an indirect dial call flow within a pre-paid call system.

Referring to FIG. 5, a 00– indirect dial call flow with 00– alternate billing access is depicted. In addition to the 0+ pre-paid call system described above, this embodiment includes an operator assistance platform (30) in communication with the IXC network (22). In this embodiment, the subscriber uses the telecommunication device (10) to dial 00 in order to use an operator assistance or alternative billing platform (Step 501). The 00 in this embodiment may be referred to as an alternate billing designation or as an indirect dial post paid access designation. In response to the subscriber dialing 00 the telecommunication device (10) routes the call and call context to the LEC (12) (Step 501). The LEC identifies the call as a 00– call and uses the ANI to determine the subscriber's long distance carrier. The LEC routes the call and call context to the subscriber's long distance carrier (14) (Step 502). The long distance carrier (14) routes the call and call context to the operator assistance/alternate billing ("OA/AB") platform (28) (Step 503). The alternate billing platform communicates with the subscriber via an interactive voice response system to determine if the subscriber would like to use an alternate billing service or request operator assistance. For example, alternate billing services include collect billing, third party billing, or calling card billing. If the subscriber chooses an alternate billing service, the call is routed through the telecommunication network (100, 14, 22, 24) to the destination telecommunication device (26) (Step 504). If the subscriber requests operator assistance the call is routed through the telecommunication network (100, 14, 22) to operator assistance (30) (Step 505). When the destination telecommunication device is answered an ANM is used to trigger MOU monitoring for billing (Step 506).

Any of the equipment used in the above embodiments may be off the shelf or custom equipment designed to implement any of the systems or methods described above. As described above, any of the local exchange carriers or long distance carriers may be implemented as service switching points ("SSP"). Specifically, one example of a local exchange carrier service switching point that may be used is a Nortel DMS100/200 or Lucent 4ESS or 5ESS. One example of a long distance carrier service switching point that may be used is a Nortel DMS 250 or the DMS 300 for international access or Lucent 4ESS or 5ESS.

Any type of custom or off the shelf equipment may be used to implement the pre-paid, alternate billing, or operator assistance platforms described above. These platforms are typically implemented as service control points ("SCP"). Examples of pre-paid service control points are the various products available from Encompass. One example of an alternate billing service control point is the Intervoice Automated Operator Service/Post Paid platform. Examples of an operator assistance platform are the Intelis Enhanced Operator Services Platform ("EOS") or the Lucent Traffic Operator Position System ("TOPS").

The databases in the above embodiments may be implemented using a custom or off the shelf software application. Specifically, examples of a pre-paid ANI lookup database are the Nortel DMS 200 or 250 ANI Value Table embedded in an SSP. An example of a pre-paid ANI account database is the Encompass Pre-Paid platform.

The inter-exchange network described above may be implemented using any number of custom or off the shelf network elements. Examples of such off the shelf network elements are the Nortel DMS 200, 250, and 300.

The embodiments described above provide more flexible access to pre-paid long distance service. Flexibility is achieved by allowing concurrent use of 1+ post paid and 0+ pre-paid access for the same subscriber. Concurrency is provided because the long distance carrier is configured to identify whether the subscriber chose pre-paid access by dialing a 0+ telephone number or alternatively chose post paid access by dialing a 1+ telephone number. Each time a subscriber decides to make a telephone call they choose either to make the call using 1+ post paid service or 0+ pre-paid service. Using this system and method a subscriber need not change or forfeit any access to 1+ post paid calls.

While these embodiments have been described in the domestic context referencing 0+ and 1+ numbers, these embodiments apply equally in the international context of 01+ and 011+ numbers. For example, an international direct dial pre-paid access designation of 01 may be treated the same as a domestic direct dial pre-paid access designation 0 and an international direct dial post paid access designation of 011 may be treated the same as a domestic direct dial post paid access designation of 1. International calls use a different scheme than domestic calls, the international scheme is: access designation, country code, city code, telephone number. Although domestic and international calls use a different scheme, in both schemes the access designation appears at the beginning of the scheme and may be treated similarly. The above embodiments may be provided in the international context by replacing the 0 access designation with the 01 access designation and replacing the 1 access designation with the 011 access designation. Alternatively, the above embodiments may use a direct dial pre-paid access designation of either 0 or 01, and a direct dial post paid access designation of either 1 or 011. This would allow the above system to handle both domestic and international calls.

Although the present invention has been described with reference to these embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

We claim:

1. A method for providing long distance telecommunication services to a subscriber having a telecommunication device configured to communicate with a telecommunication network, the method comprising:
   receiving a telephone call from the telecommunication device to a destination associated with a telephone number;
   identifying whether an access designation is present before the telephone number associated with the destination;
   determining whether the telephone call comprises one of a request for pre-paid access and post-paid access based on the access designation; and
   routing the telephone call based on the determination.

2. The method of claim 1, wherein the access designation is one of a 0 access designation and a 01 access designation.

3. The method of claim 1, further comprising:
   verifying the telecommunication device is associated with a pre-paid account having a desired minimum balance when the telephone call comprises the request for pre-paid access;
   routing the telephone call to the destination telephone number;
   monitoring a duration of the telephone call;
   debiting the prepaid account based on the duration monitored.

4. The method of claim 1, further comprising:
   identifying whether the telecommunication device is associated with a post paid restriction when the telephone call comprises the request for post-paid access; and
   terminating the telephone call if the telecommunication device is associated with the post paid restriction.

5. The method of claim 4, wherein the post paid restriction comprises restricted access to all toll numbers.

6. The method of claim 1, further comprising:
   identifying whether the telecommunication device is associated with a post paid option when the telephone call comprises a request for post-paid access; and routing the telephone call to the destination if the telecommunication device is associated with the post paid option and the access designation is one of a 1 and 011 access designation.

7. The method of claim 1, further comprising:
identifying whether the destination telephone number is a toll free number; and
routing the telephone call to the destination if the destination telephone number is a toll free number and the direct-dial-access designation is a 1 access designation.

8. The method of claim 1, further comprising:
identifying an indirect dial access designation is present;
routing the telephone call to an alternate billing platform if the indirect dial access designation is present.

9. The method of claim 8, wherein the indirect dial access designation is 00.

10. The method of claim 8, wherein the alternative billing platform comprises at least one of collect billing, third party billing, and calling card billing.

11. The method of claim 1, wherein the subscriber communicates with the telecommunication network without the use of a pre-paid long distance calling card.

12. A system for providing long distance telecommunication services to a subscriber having a telecommunication device configured to communicate with a telecommunication network, the system comprising:
a local exchange carrier in communication with the telecommunication network, the local exchange carrier being configured to receive a telephone call from the telecommunication device to a destination associated with a telephone number preceded by an access designation, determine whether the telephone call comprises a request for one of pre-paid access and post-paid access based on the access designation, and route the telephone call via the telecommunication network to a long distance carrier in communication with the telecommunication network;
wherein the long distance carrier is configured to route the telephone call based on the determination.

13. The system of claim 12, wherein the access designation is one of a 0 and a 01 direct dial access designation.

14. The system of claim 12, wherein the long distance carrier is configured to route the call to the destination if the destination telephone number is a toll-free number and the access designation is a 1 access designation.

15. The system of claim 12, further comprising:
an automatic number identification (ANI) database in communication with the long distance carrier, wherein the ANI database is operative to associate the telecommunication device with a post paid restriction; and
wherein the long distance carrier is configured to terminate the telephone call if the telecommunication device is associated with the post paid restriction.

16. The system of claim 15, wherein the post paid restriction comprises restricted access to all toll numbers.

17. The system of claim 12, further comprising:
an automatic number identification (ANI) database in communication with the long distance carrier, wherein the ANI database is operative to associate the telecommunication device with a post paid option; and
wherein the long distance carrier is configured to route the call to the destination number if the telecommunication device is associated with the post paid option and the access designation is one of a 1 access designation and a 011 access designation.

18. The system of claim 12, wherein the long distance carrier is configured to route the call to an alternate billing platform if the access designation is an indirect dial access designation.

19. The system of claim 18, wherein the indirect dial access designation is 00.

20. The system of claim 18, wherein the alternate billing platform comprises at least one of collect billing, third party billing, calling card billing, and operator assistance.

21. The system of claim 12, further comprising:
an automatic number identification (ANI) account database in communication with the long distance carrier, wherein the ANI account database is operative to verify the telecommunication device is associated with a pre-paid account having a desired minimum balance; and
wherein an pre-paid platform is operative to monitor the call and debit the pre-paid account based on the monitoring.

22. The system of claim 12, wherein the long distance carrier is further configured to provide an automatic number identification (ANI) value to the pre-paid platform.

* * * * *